Nov. 8, 1949 N. FREE 2,487,700
DRAFTING INSTRUMENT
Filed May 20, 1946 2 Sheets-Sheet 1

INVENTOR.
NELSON FREE
BY
Whittemore Hulbert & Belknap
ATTORNEYS

Nov. 8, 1949     N. FREE     2,487,700
DRAFTING INSTRUMENT
Filed May 20, 1946     2 Sheets-Sheet 2
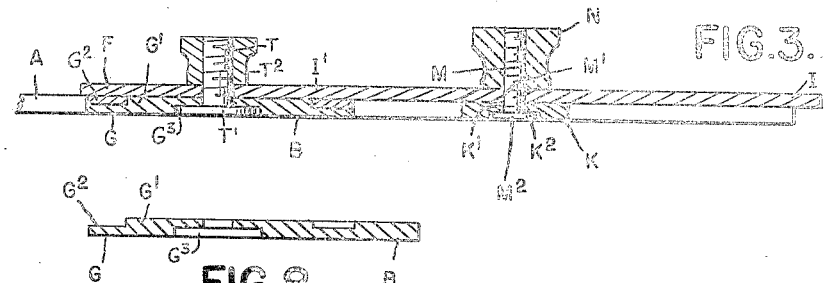
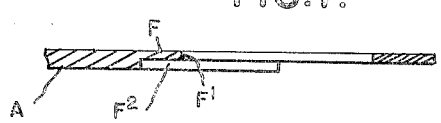
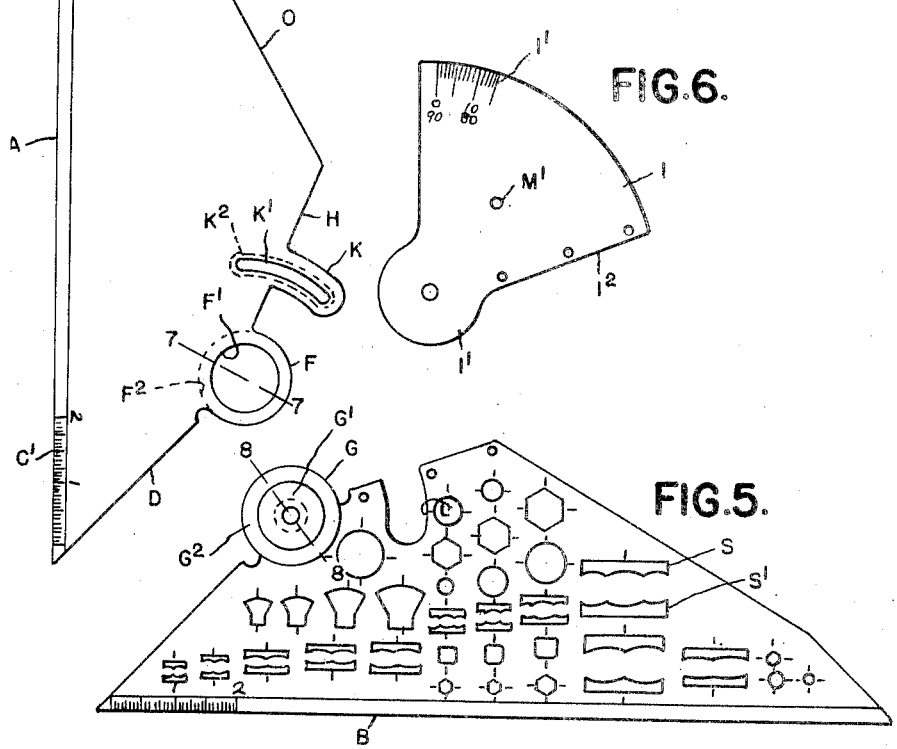
*INVENTOR.*
NELSON FREE
BY
Whittemore Hulbert & Belknap
ATTORNEYS Patented Nov. 8, 1949

2,487,700

UNITED STATES PATENT OFFICE 2,487,700

DRAFTING INSTRUMENT

Nelson Free, Detroit, Mich.

Application May 20, 1946, Serial No. 670,952

1 Claim. (Cl. 33—75)

It is the object of the invention to provide a device for use of draftsmen in the preparation of mechanical drawings, which expedites the work and to a considerable extent avoids the necessity of using other instruments. To this end the invention consists in the construction as hereinafter set forth.

In the drawings:

Fig. 3 is a section on line 3—3, Fig. 1;

Figs. 4, 5 and 6 are plan views of the principal elements of the device detached;

Fig. 7 is a section on line 7—7, Fig. 4;

Fig. 8 is a section on line 8—8, Fig. 5.

Figure 1:
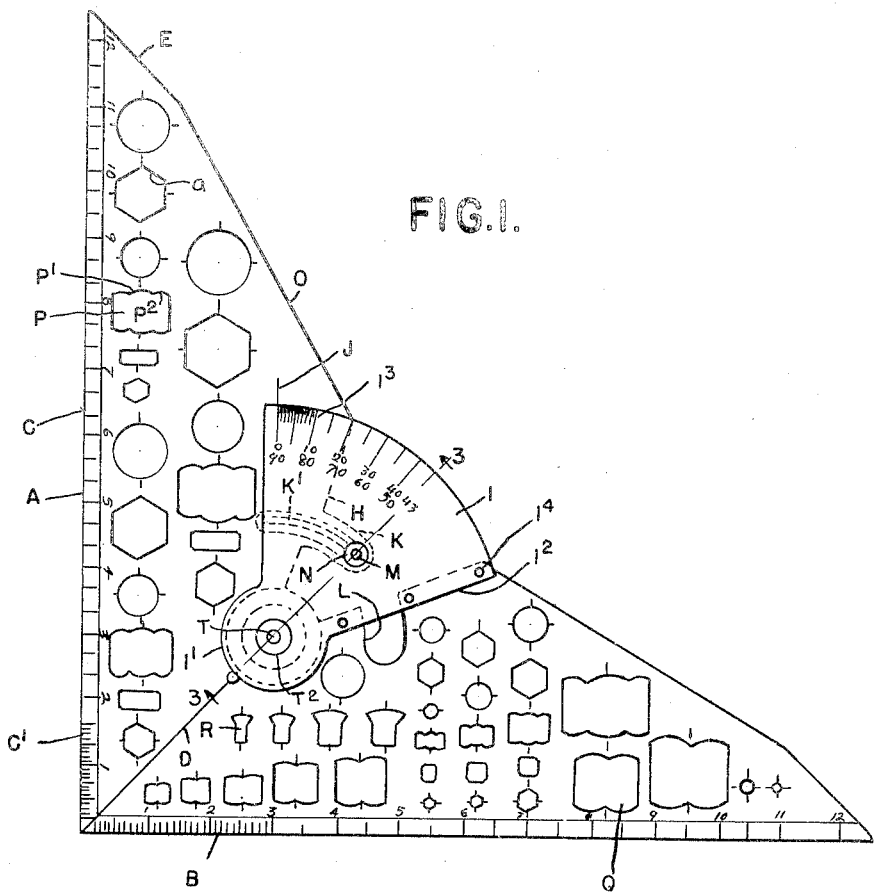
Fig. 1 is a plan view of the instrument.
Figure 2:
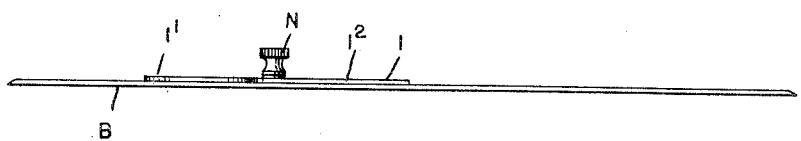
Fig. 2 is a side elevation thereof.

In general form the instrument is similar to a draftsman's right angle triangle which, however, is formed in two generally triangular sections A and B. Each of these sections has adjacent to its long side C a scale C' and extending at an angle of 45° from each end of this long side are sides D and E. When the sides D of the two sections A and B are placed together, the sides C thereof will be at right angles to each other. Beyond the sides D the sections A and B have overlapping portions F and G which are pivotally secured to each other. However, the sections A and B are of the same thickness and arranged in the same plane and, therefore, the portions F and G are sufficiently cut away to permit of such arrangement. Specifically, the portion G has a circular part G' centered in line with the side D and of the full thickness of the section B. Surrounding this part G' is an annular groove $G^2$ which reduces the thickness of the section beneath the same. The portion F of the section A has a circular aperture F' centered in alignment with the side D and fitting the portion G'. Surrounding the aperture F' on the underside of the section A is an annular groove $F^2$ corresponding to the groove $G^2$ so that the thickness of the remaining material in the portions F and G together equals the thickness of the sections A and B. Also pivotal connection is formed between the sections which permits a limited angular movement thereof in relation to each other. Beyond the portions F and G each of the sections A and B is further cut away to form a side H extending from the center of the pivotal connection at an angle of 22½° to the side D. This permits of relatively moving the sections A and B so that the sides C thereof extend at a minimum angle of 45° to each other. However, these sides C may be adjusted to any angle to each other between 45° and 90° and to facilitate exact adjustment, a protractor section I is provided. This has a portion I' which overlaps the portions F and G and a flaring portion $I^2$ with a segmental outer edge having the protractor markings $I^3$ adjacent thereto. The section I is preferably attached to the section B by suitable means, such as rivets $I^4$, connecting overlapping portions. The protractor angle markings extend 45° from the zero point which registers with the line J on the section A when said section is at right angles to the section B. Thus, any angle can be exactly obtained by registering this line J with the corresponding angle marking on the protractor. The sections A and B are held together by a bolt T passing through a central aperture in the part G' and a registering aperture in the portion I'. A head T' of this bolt engages a recess $G^3$ in the part G' and a nut $T^2$ engages the bolt above the portion I'. To hold the sections A and B in any position of relative angular adjustment, the section A has a segmental projecting tongue K extending from the side H and the section B is provided with a corresponding segmental groove L for receiving this tongue. The tongue K has a slot K' therein which also extends into the portion of the section beyond the side H and a clamping screw M passes through this slot and an aperture M' in the protractor section I. There is also a groove $K^2$ on the underside of the tongue K on opposite sides of the slot K' for receiving a head $M^2$ on the clamping screw M. A knurled nut N engages the screw M and together therewith forms the clamp for holding the sections A and B against relative movement.

The sections A and B are preferably formed of a transparent plastic so that all lines on the drawings may be viewed therethrough. The long sides C are preferably provided with bevel edges and the scale markings C' are preferably made on the underface of the section but can be viewed through this bevel edge. As previously stated, the sides E are at an angle of 45° to the long sides C and extend a short distance therefrom. Beyond these sides E the sections A and B are further cut away to form sides O which are at an angle of 15° to said side E and extend to a point of intersection with the sides H. The sections A and B are further provided with a multiplicity of cut-outs forming stencils for the drawing of various mechanical parts of predetermined dimensions. Thus, as shown, the section A has adjacent to its long side an aligned series of cut-outs and parallel to this series, another series of cut-outs. These cut-outs include circular and hexagonal forms of different dimensions corresponding to standard bolts and nuts. There is also included in the series a cut-out P which corresponds to a hexagonal nut or bolt head when viewed perpendicular to one of its sides. The top and bottom edges have arcuate contours P' and P² which correspond to the chamfer curves. The section B has cut-outs including several corresponding to the cut-out P but of different dimensions; also, a series of cut-outs Q which correspond to a standard nut or bolt head when viewed perpendicular to one of the edges between the sides thereof. Further, there are circular and hexagonal cut-outs and cut-outs R correspond to rivets of various dimensions and thus the draftsman has a large variety of stencils to choose from. Consequently, an accurate drawing can be made much more expeditiously than possible without such assistance.

From the description as above given, the utility of the instrument is obvious and need not be described more in detail.

The cut-outs shown in Fig. 5 are modified somewhat from those shown in Fig. 1. In particular, in Fig. 5 pairs of cut-outs S, S' each having an arcuate contour corresponding to chamfer curves are substituted for a single cut-out in Fig. 1 having arcuate contours on the top and bottom edges thereof. Also, the width of each cut-out is less in Fig. 5 than in Fig. 1 and it is bounded by a straight edge opposite the arcuate edge. This modified construction provides the same stencil curves without cutting away so much of the material. As the sections A and B can be adjusted to various angles in relation to each other and either section can be placed adjacent to a straight edge or T-square, this enables the draftsman to turn the cut-outs into any desired angular relation to the drawing.

What I claim as my invention is:

A drafting instrument comprising a generally right angle triangle formed in two sections lying in the same plane and provided with overlapping portions of reduced thickness fashioned to form together with full thickness portions a pivotal connection therebetween, said sections being cut away on one side of said pivotal connection to permit a relative movement thereof through an angle of 45°, and a protractor centered in the pivot axis being connected to one of said sections and overlying the other of said sections, the cut-out portion of the section unattached to said protractor having a projecting segmental slotted tongue for engaging a corresponding recess in the other section, means for holding said pivotal connection from separation, and a clamp on said protractor engaging said slotted tongue for holding said sections in different predetermined positions of angular adjustment.

NELSON FREE.

REFERENCES CITED

The following references are of record in the file of this patent:

UNITED STATES PATENTS

| Number | Name | Date |
|---|---|---|
| D. 139,083 | Macht | Oct. 10, 1944 |
| 1,098,210 | Anderson | May 26, 1914 |
| 1,127,033 | Lesh | Feb. 2, 1915 |
| 1,154,673 | Van Ness | Sept. 28, 1915 |
| 1,351,527 | Lopez | Aug. 31, 1920 |
| 2,080,620 | Martin | May 18, 1937 |
| 2,154,753 | Kallio | Apr. 18, 1939 |
| 2,247,327 | Brady | June 24, 1941 |
| 2,364,529 | Hill | Dec. 5, 1944 |

FOREIGN PATENTS

| Number | Country | Date |
|---|---|---|
| 8,811 | Great Britain | A. D. 1893 |
| 209,255 | Germany | Dec. 22, 1907 |
| 233,583 | Germany | Apr. 12, 1911 |
| 446,147 | France | Sept. 25, 1912 |
| 355,856 | Great Britain | Sept. 3, 1931 |